United States Patent [19]

Krieger

[11] Patent Number: 5,473,159
[45] Date of Patent: Dec. 5, 1995

[54] PROCESS OF MAKING A THREE-DIMENSIONAL PLANAR OBJECT WITH A MAIN FACE BEARING IN IMAGE IN COLOR

[76] Inventor: John J. Krieger, 268 Main St. #249, North Reading, Mass. 01864

[21] Appl. No.: 153,825

[22] Filed: Nov. 16, 1993

[51] Int. Cl.$^6$ .................................................. H04N 1/21
[52] U.S. Cl. ............................................ 250/318; 358/503
[58] Field of Search ............................. 250/318; 358/503

[56] References Cited

U.S. PATENT DOCUMENTS

| | | | |
|---|---|---|---|
| 4,202,663 | 5/1980 | Haigh | 250/318 |
| 4,270,449 | 6/1981 | Ito et al. | 250/318 |
| 4,584,601 | 4/1986 | Suzuki et al. | 358/503 |

*Primary Examiner*—Jack I. Berman

[57] ABSTRACT

A three-dimensional object including a planar main face bearing a color image therein made by the process including the steps of scanning an image onto a film base material with a characteristic gamma curve thereby converting the image into digital information, transferring the digital information to a computer wherein the information is selectively modified so as to reconfigure the characteristic gamma curve and produce secondary modified digital information to produce a second modified image, the second modified image being reproduced in image form on a thermal sublimation transfer sheet containing dye in a solid state such that upon superimposing the thermal sublimation transfer sheet onto the main face of the three-dimensional object, orienting it thereon, and applying heat so as to convert the dye into a gaseous state which will sublimate penetrating the three-dimensional object at its main face and reproducing the second modified image directly in the main face.

9 Claims, No Drawings

PROCESS OF MAKING A THREE-DIMENSIONAL PLANAR OBJECT WITH A MAIN FACE BEARING IN IMAGE IN COLOR

BACKGROUND OF THE INVENTION

1. Field of the Invention

The present invention relates to the process of making a three-dimensional (with a planar surface) object with a main face bearing an image in color which enables an image to be modified and reproduced in the three-dimensional object.

2. Description of the Related Art

It is often desirous to imprint images on three-dimensional objects of varying materials such as metal or ceramic. Traditionally, images such as those depicted on the main face of a mug, have been affixed to the surface in the form of decals which are baked on to the surface. These decals, much like the direct painting of the surface, results in a raised layer defining the image being affixed to the surface. Accordingly, it is highly desirous to be able to imprint an image directly in the surface. In order to achieve this, thermal sublimation transfer sheets are often utilized, the transfer sheet generally receiving the image from conventional color films.

Further, with the advent of digital imaging technology, it has become possible to scan images and modify them for computer display.

There is still, however, a need for a means of imprinting modified images which cannot be taken or produced by conventional photographic means on various types of three-dimensional objects.

SUMMARY OF THE INVENTION

The present invention is directed towards a process of making a three-dimensional object with a planar surface including a main face with the color image therein. The process includes an initial step of scanning an image from a film base material with a characteristic gamma curve. The scanning converts the image into digital information. The digital information representing the scanned image is then transmitted to memory means where they are stored for later material. From the memory means, the digital information representing the scanned image is transferred to a computer means. A computer means are the type which include a dimensional graphical software program. Utilizing the graphical software program, the digital information representing the scanned image is selectively modified. Particularly, the information is modified so as to reconfigure the characteristic gamma curve and produce secondary modified digital information which represents a second modified image. Once modified, the secondary modified digital information representing the second modified image is transferred to an image setter means. The image setter means reproduces the secondary modified digital information in image form on a thermal sublimation transfer sheet which contains dye in the solid state. The secondary modified image on the thermal sublimation transfer sheet is then superimposed onto the main face of the three-dimensional object. Next, the three-dimensional object and the superimposed thermal sublimation transfer sheet are confirmed in their desired orientation, and heat is applied. The heat is applied in the range of between 275° to 475° Fahrenheit so as to convert the dye to a gaseous state. Simultaneous with the heating, pressure is applied to the sublimation transfer sheet thereby containing the dye. By containing the dye during its conversion to a gaseous state, the dye sublimates penetrating the three-dimensional object at its main face and thereby reproducing the secondary modified image in the main face. Finally, the thermal sublimation transfer sheet is separated from the main surface leaving the three-dimensional object with the secondary modified image in the main face.

It is an object of the present invention to provide a process whereby an image can be modified and transferred into the surface of a three-dimensional object for display.

A further object of the present invention is to provide a process of forming a three-dimensional object with an image in its main face wherein the dye forming the image penetrates the main face of a three-dimensional object providing a smooth lasting finish.

DETAILED DESCRIPTION OF THE PREFERRED EMBODIMENT

The present invention is of a process utilized to make a three-dimensional object with a planar surface with a main face bearing a color image therein. The process begins with an image on a film-base material, the image being taken by ordinary photographic means or otherwise. On the initial film-base material, the image includes a characteristic gamma curve which defines the exposure and appearance of the image. Initially, this image on the film-base material is scanned so as to convert the image into digital information. The scanning is performed preferably by a laser scanner. The digital information representing the scanned image is then transmitted to memory means. Memory means can be part of the computer or it can be a direct storage medium such as a compact or floppy disk connected to the scanner. Within the memory means, the digital information representing the scanned image is stored for repeated later uses upon retrieval. When immediately continuing the process and thereby retrieving the digital information from the memory means, the digital information is transferred from the memory means to a computer means. The computer means can be a standard computer having sufficient memory and capability to perform complex digital enhancing and the like. A primary requisite of the computer means is that it include a dimensional graphical software program. Utilizing the dimensional graphical software program, the digital information representing the scanned image is selectively modified. The modification primarily includes reconfiguring the characteristic gamma curve of the image, and may include altering the exposure, superimposing multiple images, selecting portions of an image, or other similar type procedures. Once modified, a secondary modified digital information representing a second modified image is produced. This secondary modified digital information representing the second modified image can also be stored in the memory means for subsequent storage and retrieval. When desired, the secondary modified digital information representing the second modified image is transferred to an image setter means. The image setter means are particularly adapted to convert the secondary modified digital information representing the second modified image into a two-dimensional image of the second modified image. Preferably, the two-dimensional image is placed on conventional four color films, the four color films representing cyan, magenta, yellow, and black. Next, the secondary modified image is reproduced in image form onto a thermal sublimation transfer sheet. The thermal sublimation sheet is of the type including dye in its solid state thereon. The secondary modified image on the thermal sublimation transfer sheet is then superimposed onto the main face of the three-dimensional object. Once properly oriented and positioned, the three-dimensional object and the superimposed thermal sublimation transfer sheet are confirmed, thereby securing them in place. Heat is then applied to the thermal sublimation transfer sheet and 3-D object, the heat preferably being in the range of between 275° to 475° Fahrenheit. The temperature range of the heat applied depends primarily on the material of which the three-dimensional object is composed. In some instances then, the heat applied could be lower than the preferred range or substantially higher than the preferred range. The materials may vary from metal and ceramic to fabrics or mylar, but the preferred embodiment utilizes metal. The exact temperature and time over which the heat is applied vary depending on the type of material. For example, metal will call for a higher temperature, ceramic will require more time, and fabric requires longer time at a lower temperature such that the fabric will not burn and the dye will not bleed in the material. The purpose of applying the heat is to convert the dye on the thermal sublimation transfer sheet into a gaseous state. Simultaneously with applying the heat, pressure is applied to the thermal sublimation transfer sheet. The pressure is applied so as to contain the dye when it is heated. When contained, the dye will sublimate and penetrate the three-dimensional object at the main face. Upon penetration, a secondary modified image is reproduced in the main face of the three-dimensional object. Finally, the thermal sublimation transfer sheet is separated from the main surface of the three-dimensional object, and the three-dimensional object is allowed to cool.

Now that the invention has been described,
What is claimed is:

1. The process of making a three-dimensional object with a planar main face bearing an image in color comprising the steps of:

scanning an image on a film base material having a characteristic gamma curve so as to convert the image into a primary modified image in the form of digital information, transmitting the digital information representing the scanned image to memory means for subsequent storage and retrieval, transferring the digital information representing the scanned image from the memory means to a computer means including a dimensional graphic software program, selectively modifying the digital information representing the scanned image so as to reconfigure the characteristic gamma curve and produce secondary modified digital information representing a second modified image, transferring the secondary modified digital information representing the second modified image to an image setter means, reproducing the second modified image in image form on a thermal sublimation transfer sheet, containing dye in a solid state, superimposing the second modified image on said thermal sublimation transfer sheet onto the main face of the three-dimensional object, orienting the three-dimensional object and the superimposed thermal sublimation sheet, applying heat so as to convert the dye to a gaseous state, and simultaneously applying pressure to said thermal sublimation transfer sheet so as to contain the dye such that the dye sublimates penetrating the three-dimensional object at the main face thereby reproducing the second modified image in the main face, and separating said thermal sublimation transfer sheet from the main surface.

2. A process as recited in claim 1 wherein said heat applied is in the range of between 275° to 475° Fahrenheit.

3. A process as recited in claim 2 wherein said image setter means are structured and disposed to convert the secondary modified digital information to a two-dimensional image on conventional four color films.

4. A process as recited in claim 3 wherein said secondary modified digital information representing said second modified image is transmitted to memory means for subsequent storage and retrieval before being transferred to said image setter means.

5. A three-dimensional object including a planar main face bearing a color image therein made by the process comprising the steps of:

scanning an image on a film base material having a characteristic gamma curve so as to convert the image into a primary modified image in the form of digital information, transmitting the digital information representing the scanned image to memory means for subsequent storage and retrieval, transferring the digital information representing the scanned image from the memory means to a computer means, selectively modifying the digital information representing the scanned image so as to reconfigure the characteristic gamma curve and produce secondary modified digital information representing a second modified image, transferring the secondary modified digital information representing the second modified image to an image setter means, reproducing the second modified image in image form on a thermal sublimation transfer sheet containing dye in the solid state, superimposing the second modified image on said thermal sublimation transfer sheet onto the main face of the three-dimensional object, orienting the three-dimensional object and the superimposed thermal sublimation transfer sheet, applying heat so as to convert the dye to a gaseous state, and simultaneously applying pressure to said thermal sublimation transfer sheet so as to contain the dye such that the dye sublimates penetrating the three-dimensional object at the main face thereby reproducing the second modified image in the main face, and separating said thermal sublimation transfer sheet from the main face.

6. A three-dimensional object including a main face bearing a color image made by the process recited in claim 5 wherein said computer means includes a dimensional graphical software program.

7. A three-dimensional planar object including a main face bearing a color image made by the process recited in claim 6 wherein said secondary modified digital information representing a second modified image is transferred to said memory means for subsequent storage and retrieval after it is selectively modified.

8. A three-dimensional planar object including a main face bearing a color image made by the process recited in claim 7 wherein said image setter means is structured and disposed to convert the secondary modified digital information to a two-dimensional image on conventional four color films.

9. A three-dimensional planar object including a main face bearing a color image made by the process recited in claim 8 wherein said heat applied is in the range of between 275° to 475° Fahrenheit.

* * * * *